Oct. 4, 1938. K. ZWICK ET AL 2,131,779
FUEL INJECTION PUMP
Filed Sept. 18, 1935   5 Sheets-Sheet 1

Kurt Zwick
Fritz Deckel
Hans Fischlmayr
Julius Ulsamer
INVENTORS

BY Edward H. Cumpston
their ATTORNEY

Oct. 4, 1938.   K. ZWICK ET AL   2,131,779
FUEL INJECTION PUMP
Filed Sept. 18, 1935   5 Sheets-Sheet 3

Oct. 4, 1938.   K. ZWICK ET AL   2,131,779
FUEL INJECTION PUMP
Filed Sept. 18, 1935   5 Sheets-Sheet 4

Kurt Zwick
Fritz Deckel
Hans Fischlmayr
Julius Ulsamer
INVENTORS
BY Edward H. Cumpston
their ATTORNEY Oct. 4, 1938.  K. ZWICK ET AL  2,131,779
FUEL INJECTION PUMP
Filed Sept. 18, 1935  5 Sheets—Sheet 5
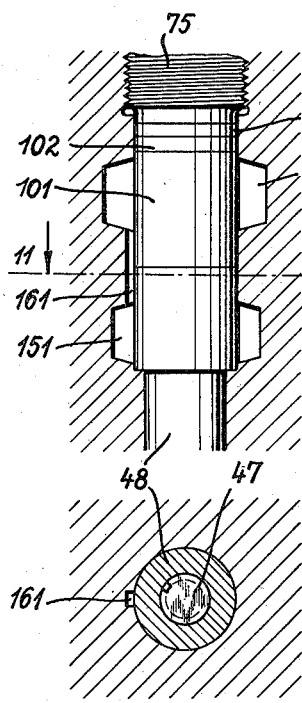
Fig. 10
Fig. 11
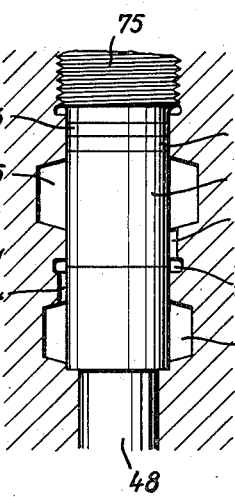
Fig. 12
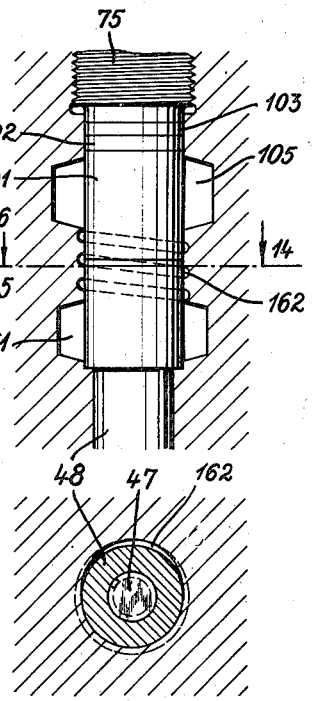
Fig. 13
Fig. 14
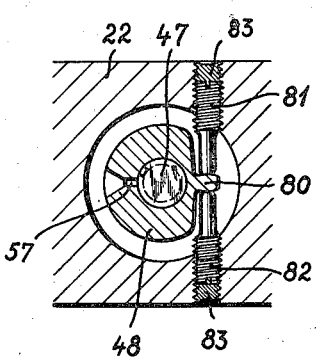
Fig. 15
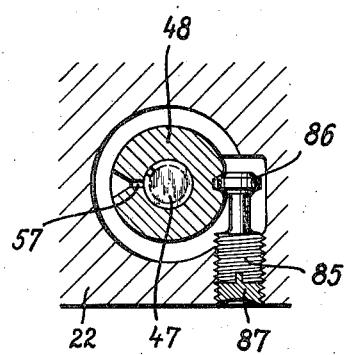
Fig. 16
Kurt Zwick
Fritz Deckel
Hans Fischlmayr
Julius Ulsamer
INVENTORS
BY Edward H. Cumpston
Their ATTORNEY Patented Oct. 4, 1938

2,131,779

UNITED STATES PATENT OFFICE 2,131,779

FUEL INJECTION PUMP

Kurt Zwick, Munich, Fritz Deckel, Munich-Prinz Ludwigshohe, Hans Fischlmayr, Grafelfing near Munich, and Julius Ulsamer, Munich, Germany, assignors to Friedrich Deckel, Munich-Prinz Ludwigshohe, Germany Application September 18, 1935, Serial No. 41,112
In Germany June 16, 1934

14 Claims. (Cl. 103—41)

This invention relates to pumps of the type used for injection of fuel into internal combustion engines, such as Diesel engines and the like.

An object of the invention is to provide a generally improved and more satisfactory and simple fuel injection pump.

Another object is the provision of such a pump supplied with suction and pressure valves of compact form and particularly satisfactory design.

Still another object is the provision of a pump in which the dead space of the pump is reduced to a minimum.

A further object is the provision of a pump having various refinements in detail and improvements in construction, such as improvements in the manner of holding the tappets against turning, and in the manner of holding the parts of the pump casing together, and in the construction of the pump casing so as to prevent unauthorized access to certain parts of the pump, and improvements in the adjustment of the quantity of fuel delivered by the pump.

To these and other ends the invention resides in certain improvements and combinations of parts, all as will be hereinafter more fully described, the novel features being pointed out in the claims at the end of the specification.

In the drawings:

Fig. 10 is a view similar to Fig. 8 showing a different modification;

Fig. 11 is a horizontal section taken substantially on the line 11—11 of Fig. 10;

Fig. 12 is a view similar to Figs. 8, 9, and 10 illustrating another modification of the passageway between the overflow chamber and the suction chamber;

Fig. 13 is a similar view illustrating still another modification thereof;

Fig. 14 is a horizontal section taken substantially on the line 14—14 of Fig. 13;

Fig. 15 is a diagrammatic horizontal section illustrating a modification of the adjusting structure illustrated in Fig. 4, and Fig. 16 is a similar view illustrating still another modification of the structure shown in Fig. 4.

The same reference numerals throughout the several views indicate the same parts.

Figure 1:
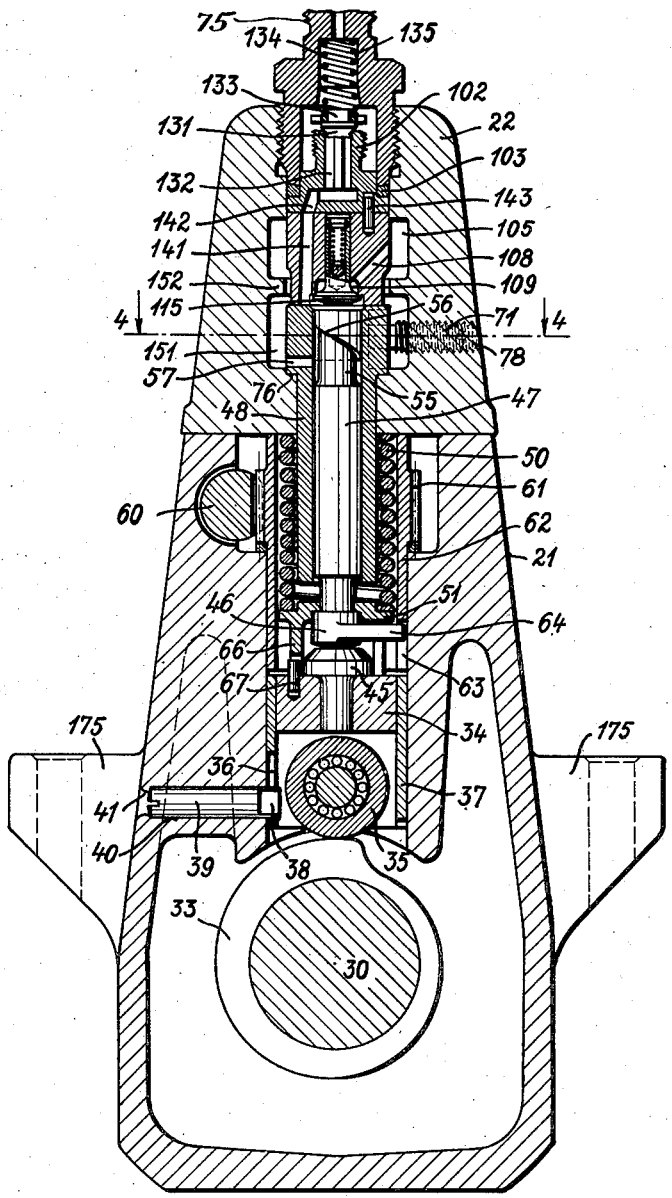
Fig. 1 is a somewhat diagrammatic vertical section through a pump constructed in accordance with a preferred embodiment of the invention.
Figure 2:
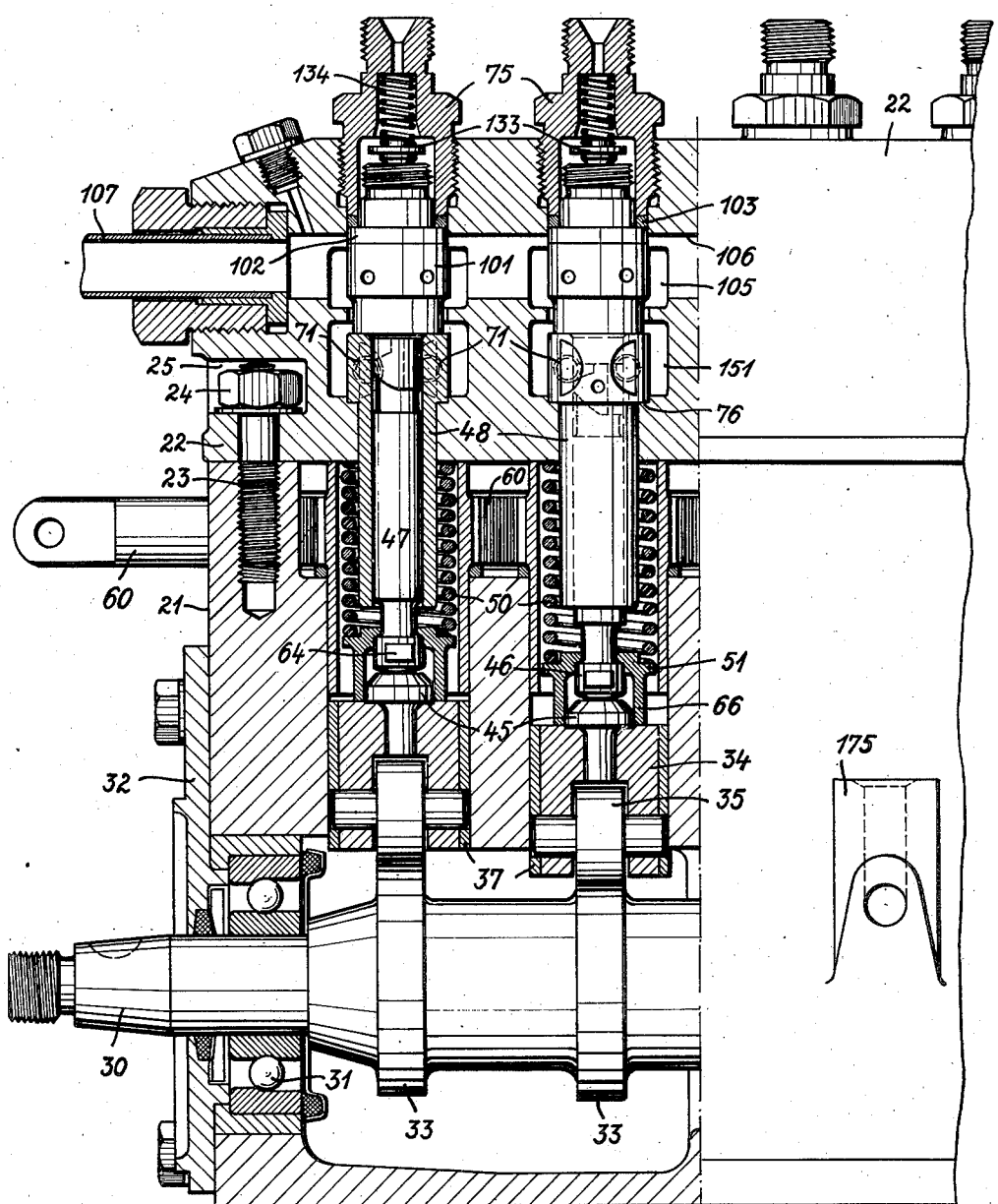
Fig. 2 is a view partly in side elevation and partly in longitudinal vertical section through the pump illustrated in Fig. 1.
Figure 3:
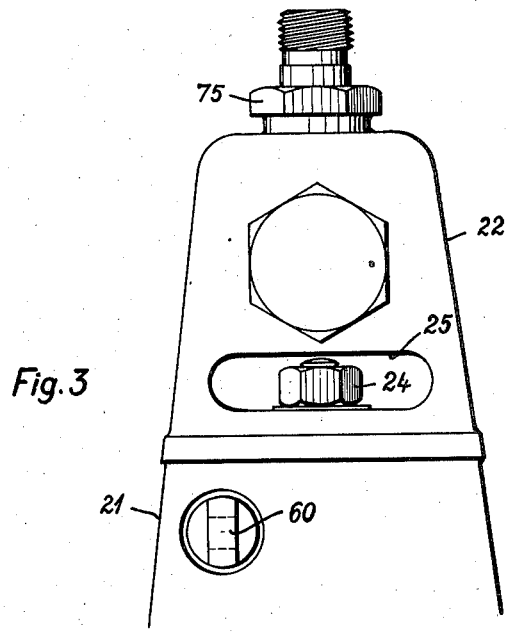
Fig. 3 is an end view of a portion of the pump illustrated in Figs. 1 and 2.
Figure 4:
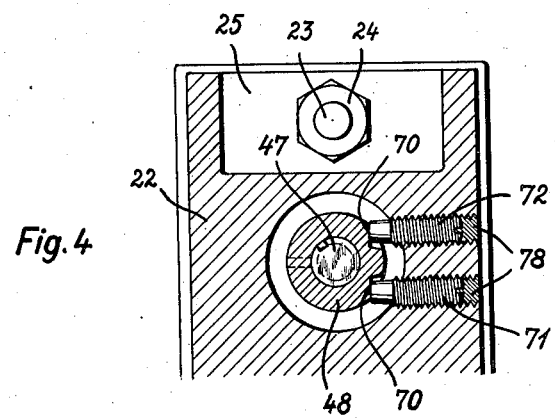
Fig. 4 is a horizontal section taken substantially on the line 4—4 of Fig. 1.

Referring now to the drawings, and particularly to Figs. 1 and 2 thereof, there is illustrated, as a preferred embodiment of the invention, a fuel injection pump having a lower casing section 21 and an upper casing section 22 joined to each other by suitable means such as bolts 23 screwed into the lower casing section and having nuts 24 bearing against the upper casing section. According to the present invention, recesses 25 are made in the casing section 22, as shown in Figs. 2, 3, and 4, for receiving the nuts 24. This novel arrangement allows the holding bolts to be made shorter than if they extended upwardly through the full height of the upper section 22, and also avoids the placing of the nuts on the outer surface of the pump housing or casing where they would accumulate oil and dirt, thus producing an improved design which is more compact and of more pleasing appearance. If desired, the recess 25 may be filled with lead on which a seal is impressed, to guard against surreptitious unauthorized tampering with the pump.

A main pump shaft 30 extends longitudinally through the lower casing section 21 and is journaled in a suitable manner, such as in the ball bearings 31 mounted in removable end plates 32 bolted onto the ends of the casing. This main pump shaft 30, as well understood in the art, is connected to the internal combustion engine with which this fuel injection pump is used, so as to be driven by the movements of the engine. The pump shaft carries a series of pump operating cams 33, corresponding in number to the number of cylinders of the engine with which this pump is used, and each cam 33 operates one pump plunger for injecting fuel into one particular cylinder of the engine.

Mounted immediately above each cam 33 in a suitable opening in the casing 21, is a tappet 34 having journaled therein a follower roller 35 for cooperation with its associated cam 33, so that as the shaft 30 rotates, the roller 35 rolls over the surface of the cam 33 and, in accordance with the shape of that cam, causes a rising and falling movement of the tappet 34.

The exterior surface of each tappet 34 is preferably circular in horizontal cross section, and the openings or guideways in the pump casing 21 within which these tappets reciprocate are preferably also circular in horizontal cross section. Novel and improved means is provided for preventing turning of the tappets in their guideways. This novel means comprises a vertical slot 36 formed in a hardened sleeve or bushing 37 secured to and moving with the tappet. Into this slot projects the flattened end 38 of a pin 39 inserted through an opening 40 in the housing. The outer end of the pin is provided with a screw head slot, as shown in Fig. 1, with which a screw driver may be engaged in order to turn the pin so that the flattened sides 38 are in proper vertical position for cooperation with the edges of the slot 36 in the tappet. To retain the pin in place, the outer end of the hole 40 is caulked slightly over the head of the pin as at 41.

With this arrangement, it is seen that the pin can not be withdrawn from the outside, and thus no unauthorized person can tamper with this part of the pump mechanism. So long as the pin is in place, it prevents any turning of the tappet in its guideway, and insures the proper alinement of the tappet roller 35 at all times with the cam 33 on which it rolls. To disassemble the pump, the tappet may be lifted upwardly out of its guideway after the plunger and other parts hereafter described are removed, and then the pin 39 may be driven inwardly into the space formerly occupied by the tappet, so that it will fall out through the tappet space, the pin being made shorter than the diameter of the tappet in order to facilitate its removal in this manner.

Each tappet 34 is provided with a head 45 which bears against the bottom end 46 of a pump plunger 47 mounted for upward and downward reciprocation in a pump barrel or cylinder formed by a sleeve or bushing 48. This sleeve or bushing is mounted in a vertical opening in the upper pump housing section 22 and projects downwardly into an opening in the lower housing section 21, as plainly shown in Figs. 1 and 2. Each time that the cam 33 lifts the tappet 34, this tappet, in turn, lifts the pump plunger 47 to inject a quantity of liquid fuel into the corresponding cylinder of the engine to which the pump is attached. Then as the cam allows the tappet to move downwardly, the pump plunger is moved downwardly by means of a coiled spring 50 surrounding the bushing 48 and pressing at its upper end against the bottom side of the upper housing section 22, and at its lower end upon a washer 51 engaged over the enlarged lower end 46 of the plunger.

Near the upper end of the pump plunger 47 there is a circumferential recess 55, the upper edge or shoulder 56 of which is formed obliquely or helically, as shown in Fig. 1, so that, by rotating the plunger to various positions, this oblique upper edge 56 may be made to uncover an overflow or by-pass port 57 in the bushing 48 at an earlier or later time in the stroke of the plunger, thus controlling the quantity of fuel delivered to the engine cylinder by each stroke of the plunger in a manner well understood by those skilled in the art. This turning of the pump plunger to adjust the quantity of fuel delivered may be accomplished, for example, by means of a rack bar 60 extending longitudinally through the pump housing and passing alongside of each of the pump plungers, and having teeth engaging teeth 61 formed on a sleeve 62 surrounding the lower part of each pump plunger. Each sleeve 62 has near its lower end a vertical slot 63 in which is engaged the end 64 of an arm formed on or secured to the bottom of the pump plunger. When the rack bar 60 is moved longitudinally in one direction or another, it thus turns all of the sleeves 62 associated with all of the pump plungers, and these sleeves cause corresponding turning movement of the respective pump plungers 47, in known manner.

Heretofore, the turning of the pump plungers has usually been accompanied by a turning or a tendency to turn the plunger return springs 50, which has been undesirable for various reasons, including the added frictional resistance to turning which has been caused by the spring pressure. According to the present invention, however, this disadvantage is entirely overcome, and an improved structure is provided. The washer 51, previously mentioned, has a depending skirt or flange 66 which extends downwardly to and rests upon the top of the tappet 34 and is so proportioned that the enlarged head 46 at the bottom of the pump plunger has a slight play between the washer 51 and the tappet head 45. Thus the force of the spring 50 is exerted primarily upon the tappet rather than upon the plunger, with the result that the plunger may be turned very easily and smoothly without any frictional drag from the spring 50. The flange 66 on the washer is, of course, cut away on that side where the plunger turning arm 64 is located.

In order to prevent any possibility of the spring washer 51 turning or shifting its position so as to interfere with the plunger turning arm 64, the flange 66 of the washer is provided with a recess which fits over and is engaged by a pin 67 mounted in and extending upwardly from the tappet 34. Thus, since the tappet is held against turning by means of the pin 39, and since the spring washer 51 is connected to the tappet by the pin 67, it follows that this spring washer can not turn and remains always in fixed position relatively to the tappet, although the pump plunger 47 may turn for the purpose of adjusting the quantity of fuel delivered by the pump, as above mentioned.

As above explained, the rotation of the various pump plungers within their bushings will vary the quantity of fuel delivered to the engine by causing uncovering of the overflow or by-pass port 57 at an earlier or later time in the plunger stroke. The movements of the rack bar 60 adjust all of the plungers simultaneously, and thus the rack bar 60, controlled by a governor, or by a throttle control, for example, may be used for the control of the internal combustion engine under varying conditions of load and speed. It is highly desirable, however, to have some simple means for individually adjusting the quantity of fuel delivered by each pump plunger so that all of the plungers will deliver equal quantities of fuel for any one setting of the rack bar 60. The arrangements heretofore proposed for effecting such individual plunger adjustment, so far as known, have all had serious drawbacks, of one kind or another, such as the introduction of cumbersome and complicated parts, an increase in the size of the pump, or a substantial added expense in the manufacturing cost. As one important feature of the present invention, there is provided an improved and simplified adjustment for the fuel delivery of the individual pump cylinders, of extremely simple character, which does not necessitate any enlargement of the pump, and which results in negligible additional cost.

This adjustment is accomplished by providing simple screw means for turning the pump cylinder bushing, in which the overflow port is located, relatively to the pump plunger, on which the oblique overflow edge is provided, or vice versa. In the present instance, since the pump plunger is turned for the normal regulation or control of the fuel delivery, the cylinder bushing is turned for the individual adjustment of the output of each plunger, but if the arrangement were reversed and the cylinder bushing were turned for the normal regulation of the pump output during operation, then the present screw adjusting means could be applied equally well to turn the pump plunger instead of the cylinder bushing.

According to a preferred embodiment of the adjusting means, the cylinder bushing 48 is provided, as best shown in Fig. 4, with two steps or flattened portions 70, formed, for example, by milling. Screws 71 and 72, threaded through lateral openings in the casing section 22, have ends which press against these steps 70, as plainly shown in Fig. 4. By tightening one screw and loosening the other, the bushing 48 may be turned to any desired position within a certain limited range, so as to adjust the overflow or by-pass port 57 in the required manner, in order that all of the separate pump plungers will deliver equal amounts of fuel during operation.

Before adjusting the pump bushing 42 by means of the screws, a certain cap nut 75, which will be mentioned in greater detail hereafter, is loosened in order to relieve the pressure on the bushing 48 and to enable it to be turned readily by the adjusting screws. After the bushing 48 has been brought to the desired adjustment, the cap nut 75 is again tightened, which has the effect of forcing a shoulder 76 on the bushing 48 tightly against a corresponding seat on the casing 22, and thus serves, in addition to the adjusting screws, to lock the bushing 48 against further rotation.

After the screws 71 and 72 have been adjusted to the desired position, lead fillings 78 can be pressed into the open outer ends of the threaded openings through which the screws extend, the screws purposely being made sufficiently short so that they do not extend fully to the outer edge of the casing as shown. These lead fillings 78 prevent any leakage around the screws and also if a special design or seal be impressed on the lead fillings, that will protect the adjusting screws against surreptitious access by unauthorized persons.

A slightly modified form of construction for accomplishing the same adjustment is illustrated in Fig. 15, in which the parts 22, 48, and 57 correspond to the previously described parts bearing the same reference numerals. The principal difference, in this modification, is that the two adjusting screws are coaxial with each other instead of being arranged side by side. The abutments against which the screws operate are here formed by opposite sides of a projecting lug or a fin 80 formed on one side of the bushing 48, and the screws 81 and 82 press against opposite sides of the portion 80, as shown. Lead fillings 83 may be provided as before, to cover the ends of the screws and prevent unauthorized access to them.

A further modification of the invention is illustrated in Fig. 16 in which a single double acting screw is provided instead of two screws. The parts 22, 48, and 57 remain as before. The single adjusting screw 85 has an enlarged circular end 86 in the nature of a peripheral flange, which fits into a groove in the pump cylinder bushing 48, as plainly shown in the drawings. When the screw is turned in one direction, the pressure of the flange 86 against one side of the groove will turn the bushing 48 in one direction, and when the screw is turned in the opposite direction, the pressure of the flange 86 against the opposite side of the groove will shift the bushing 48 in the opposite direction. As before, a lead filling and seal 87 may be employed.

In a fuel injection pump of this type, it is desirable to provide a suction valve and a pressure or discharge valve for each pump plunger. One of the most important features of the present invention resides in the novel and greatly improved construction and arrangement of such valves, in the manner herein disclosed and having the advantages hereafter pointed out.

Referring again to Figs. 1 and 2 of the drawings, the valve parts, in their preferred form, comprise a lower block or member 101 forming a seat for the suction valve, and an upper block or member 102 forming a seat for the discharge or pressure valve, these blocks 101 and 102 being arranged above one another in coaxial relation to each other and to the pump plunger 47. The lower edge of the lower block 101 rests on the upper surface of the cylinder bushing 48, and the lower surface of the block 102 rests upon the top of the block 101. A gasket 103 is interposed between a shoulder on the block 102 and the lower edge of the cap nut 75, so that when the cap nut is screwed down into place, it presses tightly on the gasket 103 which, in turn, presses downwardly on the block 102, the pressure upon which is transmitted through the block 101 to the sleeve 48 and which is resisted by the shoulder 76 on the sleeve 48.

A suction chamber 105 is formed in the housing or casing 22 around the lower block 101, and all of these suction chambers 105 of the respective pump plungers are connected to each other by a passageway 106 (Fig. 2) which is supplied with liquid fuel through a fuel supply conduit 107. One or more fuel passageways 108 extend downwardly and inwardly through the block 101, from the suction chamber 105 to a recess or opening 109 near the lower end of the block 101 just above the valve seat of the suction or inlet valve.

The valve itself is of the so-called mushroom type, having a head portion for cooperation with the valve seat and a stem portion attached to the head portion for guiding it. The details of the valve may be executed in various ways. For example, in the embodiment illustrated in Figs. 1 and 6, the head portion 115 of the valve is solid, and a hollow stem 116 extends upwardly from the top of this head portion into a corresponding guideway in the block 101. A coiled spring 117 placed within this hollow stem 116 tends to lift the valve upwardly to a closed position in which the valve head 115 lies in contact with the valve seat, but permits the valve to be opened by the suction produced by the suction stroke of the plunger. The upper end of the valve spring 117 may press, for example, against an annular ring 118 inserted in the valve stem near its top, while the lower end of the spring 117 may press against suitable abutment means, such as the rod 119 mounted in the block 101 and extending transversely through suitable slots in opposite sides of the hollow stem 116. The slots in the stem walls may be made of such length that the upper edges of the slots, coming downwardly into contact with the top of the rod 119, serve as stops to limit the maximum downward movement of the valve. A duct 121 leads through the block 101 from the suction chamber 105 to the space 122 above the top of the valve stem, thus avoiding the creation of vacuum or pressure above the valve stem which might interfere with proper operation of the valve.

Figures 5, 6, 7:
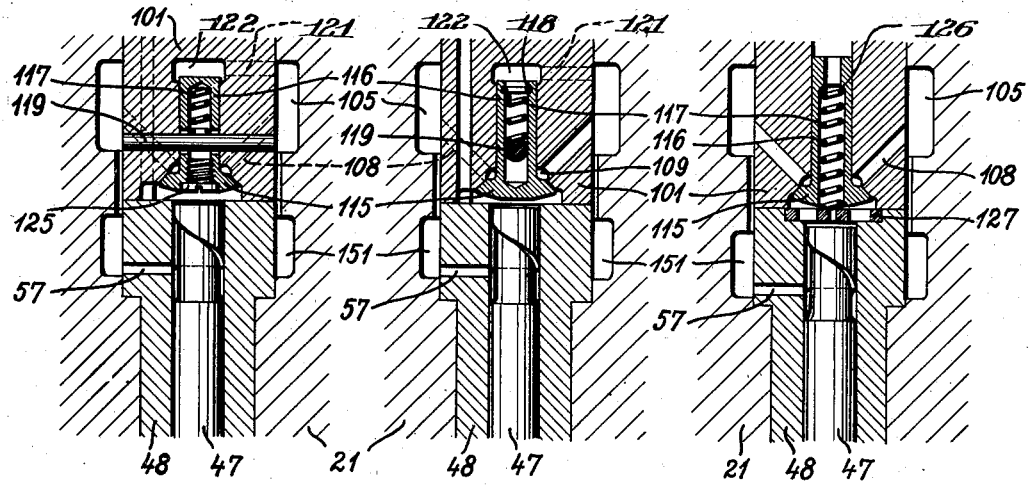
Fig. 5 is a diagrammatic vertical section illustrating a different construction of the suction valve from that shown in Fig. 1.
Fig. 6 is a similar view showing the form of suction valve illustrated in Fig. 1, but on a somewhat larger scale.
Fig. 7 is a similar view showing a further modification of the suction valve.

A slightly different form of valve is illustrated in Fig. 5. Here, the upper end of the valve stem is closed by a solid or integral partition, and the spring is inserted in the hollow stem from the bottom rather than from the top. If desired, the bottom end of the opening in the valve stem may be plugged up or closed, as by means of a screw 125. Otherwise, the various parts in this embodiment may be identical with or similar to the corresponding parts in the embodiment illustrated in Figs. 1 and 6, and they bear the same reference numerals.

A slightly different embodiment of suction valve is illustrated in Fig. 7. The difference between this and the embodiments previously described, is that here the valve stem is not closed but is open throughout its length from top to bottom, and the opening through the stem serves as a delivery passageway for the fuel delivered on the pressure stroke of the pump plunger, as will be explained in greater detail hereafter. The hollow stem is provided with a shoulder 126 near its upper end, against which the upper end of the valve spring 117 bears, and the lower end of the spring, instead of bearing upon a cross shaft extending through the stem, which might obstruct the flow of the delivered fuel through this stem, rests preferably against a perforated plate or spider 127 resting in a recess in the top of the bushing 48 and serving as a stop to limit downward movement of the valve as well as an abutment for the lower end of the spring.

The upper block 102 is provided adjacent its upper end with a seat for a pressure or delivery valve 131, also of the mushroom type, and having a stem 132 of fluted or other suitable form, extending downwardly into a guiding opening in the block 102, as shown. A projection 133 extends upwardly from the valve 131 and around this projection is the lower end of a coiled compression spring 134 which extends upwardly into a cavity 135 in the cap nut 75 and tends constantly to force the valve 131 downwardly against its seat.

The fuel delivery passageway may extend upwardly through the lower block 101 in an eccentric position offset laterally from the suction valve, as indicated at 141, and may connect at its upper end with a passageway 142 formed in the upper block 102 and leading to the underside of the pressure valve 131. A pin 143 extends partially into the block 101 and partially into the block 102 to hold these two blocks against turning relatively to each other, so as to keep the fuel passageway 141 accurately alined in connecting relationship with the passageway 142. This obviates the necessity of an annular groove or passageway in the face of one block or the other, and thus further reduces the dead space of the pump.

In place of fuel delivery passageways 141 and 142 offset eccentrically to one side of the suction valve, the delivery passageway may extend straight upwardly through the hollow stem 116 of the suction valve 115, as already mentioned in connection with Fig. 7 of the drawings.

On the downward or suction stroke of the pump plunger, fuel is drawn into the plunger chamber from the suction chamber 105 through the conduits 108 and past the suction valve 115. Then on the subsequent upward or pressure stroke of the plunger, the fuel is forced upwardly through the passageways 141 and 142 (or through the hollow stem of the suction valve), past the pressure valve 131 which is forced open by the pressure, and upwardly through the cavity 135 in the cap nut and through any suitable conduit connected to the top of the cap nut and leading to one of the cylinders of the internal combustion engine with which the fuel pump is used.

Toward the latter end of the upward or forward stroke of the pump plunger at a variable point depending on the adjustment of the controlling rack 60, the inclined shoulder or edge 56 on the plunger uncovers the overflow or bypass port 57 and stops the delivery of fuel to the engine cylinder by allowing the fuel to escape through the port 57 during the remainder of the pressure stroke. The fuel thus by-passed flows through the port 57 into a by-pass chamber 151 formed in the upper casing section 22 in a position beneath the suction chamber 105 and surrounding the upper end of the cylinder bushing 48, as plainly shown in the drawings. From the by-pass chamber 151, the by-passed fuel may flow into the suction chamber 105 through one or more relatively restricted passageways. The chamber 151 does not open directly and unrestrictedly into the suction chamber 105, for the reason that if this were the case, the sudden discharge of the by-passed fuel through the port 57 would cause undesirable pulsations and vibrations in the suction chamber 105, which would seriously interfere with the regular and even flow of fuel from the suction chamber into the plunger chamber. When the by-passed fuel is delivered first into a receiving chamber 151, which is connected to the suction chamber 105 only by a relatively restricted passageway, however, then the pulsations and vibrations of the fuel have time to quiet down in the receiving chamber 151 before the fuel reaches the suction chamber 105 and do not adversely affect the quiet flow of fuel in the chamber 105.

The restriction of the communication or passageway between the by-passing or receiving chamber 151 and the suction chamber 105 may be accomplished in a number of ways. One simple form is illustrated in Figs. 1 and 2, in which a partition 152 partially separates the two chambers from each other, extending inwardly toward the block 101 but not quite touching it at all points of its periphery, although it may touch it at certain points if desired. In other words, one or more small passageways 153 are left between the partition 152 and the block 101 to serve as a connection between the chambers 151 and 105. The communication 153 may be a narrow annular slot extending upwardly around the block 101, or it may be a series of passageways formed, as for example, by milling flutes longitudinally of the block 101 at various points around its periphery, the partition 152 coming into direct contact with the block 101 at the points where no flutes are milled.

Figures 8, 9:
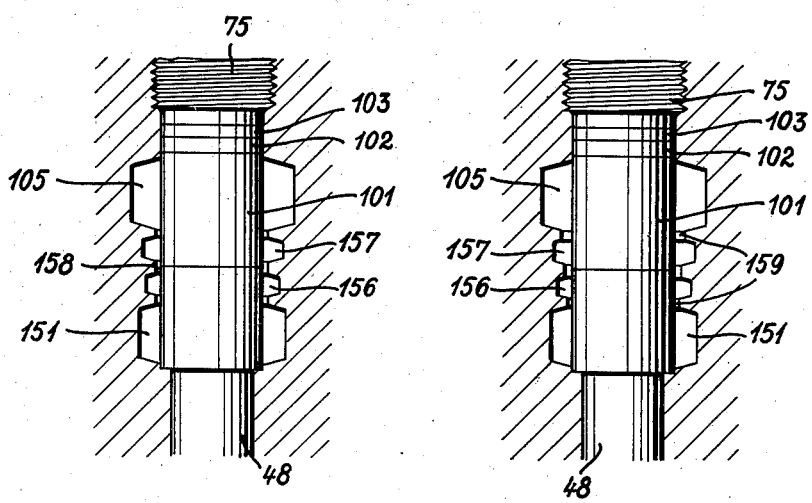
Fig. 8 is a diagrammatic view illustrating a modification of the formation of the overflow passageway between the by-pass or overflow chamber and the suction chamber of the pump.
Fig. 9 is a view similar to Fig. 8 showing still another modification.

A variation in the form of the restricted communication between the chambers 105 and 151 is illustrated in Fig. 8 of the drawings. Here, two small intermediate chambers 156 and 157 may be provided between the main chambers 105 and 151, and may be connected to each other and to the chambers 105 and 151 by grooves or an annular slot 158. The intermediate chambers 156 and 157 may be of the same size or of different sizes, as shown, and serve as means for further quieting the vibrations and pulsations of the fuel as it flows from the by-pass chamber 151 to the suction chamber 105.

In Fig. 9, there is illustrated a further modification, likewise employing the intermediate chambers 156 and 157. In this case, however, the passageway or passageways 159 connecting the chambers to each other, are not of the same size but are of different sizes as plainly illustrated in the drawings. This is sometimes of advantage in producing a further throttling effect on the fuel to reduce the pulsations thereof before the fuel reaches the suction chamber 105.

In Figs. 10 and 11 there is shown a modification in which the suction chamber 105 and the by-pass chamber 151 are connected to each other by only a single groove 161, which thus produces a strong throttling effect upon the fuel.

In Figs. 13 and 14 is a still different embodiment in which the chambers 105 and 151 are connected by a groove 162 extending spirally or helically around the block 101 or the cylinder bushing 48, or both, so that the length of the connecting groove is considerably increased over the length of the straight groove 161, with a consequent increase in the throttling action.

In Fig. 12 there is still another modification shown, in which a passageway 164 extends upwardly part way from the by-pass chamber 151 but not all the way to the suction chamber 105. The upper end of the passageway or duct 164 opens into an annular passageway 165 which, in turn, is connected to the suction chamber 105 by a longitudinal passageway 166 offset from the passageway 164 so that the fuel must travel around the annular passageway 165 in order to pass from the duct 164 to the duct 166.

It will now be seen that the present invention provides a particularly improved and efficient arrangement for the suction valve and pressure valve of each pump plunger, and also for the throttling or pulsation-reducing communication between the by-pass chamber and the suction chamber. The suction valve and the pressure valve, in all of the embodiments described, are located coaxially or substantially coaxially with each other and with the pump plunger, which arrangement has the great advantage of reducing the size of the upper part of the pump, permitting the pump to be made much narrower and the entire pump to be much more compact than if the valves were placed side by side, for example. Furthermore, this arrangement enables the openings through the casing or housing sections 21 and 22 to be arranged vertically in alinement with each other, and to be so designed that all of the principal interior parts of the plunger mechanism and valve mechanism can be drawn vertically outwardly through these openings when the cap nut 75 is removed and when the upper casing section 22 is detached from the lower casing section 21.

It is also to be noted, as an important feature, that in all embodiments of the suction valve which have been described, the valve opens in a direction toward the pump plunger, which is the same direction as the flow of fuel on the suction stroke of the plunger. Thus the fuel does not have to reverse its direction of travel when flowing from the suction chamber into the plunger chamber, as would be the case if the suction valve opened in an opposite direction. Moreover, a specially advantageous feature resides in the use of a suction valve of the mushroom type, with the valve stem on the opposite side of the valve head from the plunger chamber and with the valve spring likewise on the opposite side of the head from the plunger chamber. These details are of importance because the location of the spring and stem on the upper side of the valve head enable the dead space of the pump to be considerably reduced from the dead space that would be required if either the stem or the spring were placed on the same side of the valve as the plunger. The use of a mushroom type of valve, embodying a guiding stem, is of great importance because only by the use of such a valve can a pump of this type be made practical and efficient. Valves of other types, such as ball valves and disk or plate valves, frequently give satisfactory service in hydraulic pumps, air compressors, and the like, but such valves are not suitable in high speed, high pressure fuel injection pumps, because the great pressures encountered in such fuel injection pumps and the high speed at which such valves must work require valves of the utmost tightness and efficiency, and plate valves, ball valves, and the like, are not suited to these uses.

The mushroom type of valve is superior not only because the guiding stem insures accurate placing of the valve head against the valve seat, but also because the valve head and seat can be made to have a very fine contact, almost a line contact with each other to insure a tight fit, as, for example, either by making the valve seat with sharp corners to contact with the valve, or by grinding the valve and the seat both conical but with a slightly different angle, so that they will come into contact with each other practically along a line and insure maximum tightness when the valve is closed.

A careful study of the various embodiments herein disclosed will show to those skilled in the art that these embodiments all represent important advances in the art and highly efficient and satisfactory constructions, in which the dead space of the pump is reduced to a minimum and in which the parts are relatively few, simple, and rugged, capable of being readily assembled and disassembled, and operating in an efficient manner.

Another advantageous feature of the pump design of the present invention is that there is no necessity for openings for obtaining access to the lower part of the pump housing at either side, although hand holes, or the like, have usually been necessary in the casings of prior fuel pumps in order to obtain access to the interior of the housing for adjustment or repair. Consequently, in the present pump, the side walls of the housing are made solid, without any removable cover plates or the like, with the result that the pump may readily be mounted in a number of different positions on the engine with which it is used, it being immaterial which side of the pump is placed toward the engine. The solid side walls on the housing have the further advantage that they prevent unauthorized access to the interior of the pump or tampering with the interior parts of the pump, which can be accomplished with many other types of fuel injection pumps by removing cover plates from the sides of the pump housing. It is true that end plates 32 are bolted on the pump housing in the present instance, and carry bearings for the main shaft 30, but these end plates can not be easily or surreptitiously removed because of the shaft passing through them, and therefore there is not the same danger of tampering with these plates that there is of tampering with mere cover plates placed over hand holes in the side walls of the pump.

Lugs 175 may be formed integrally on the side walls of the lower part 21 of the pump housing, at any desired points, to assist in securing the pump to the engine with which it is used.

Only the parts 47, 48, 75, 101, 102, 115, and 131 need be made of heavy or dense metal to resist the high liquid pressure of the fuel, and the main casing parts 21 and 22 can be made of light or porous metal since they do not have to withstand the high delivery pressure of the liquid fuel. The fuel in the chambers 105 and 151 is only at the low pressure at which the fuel is fed to the pump, and not at the high pressure at which it is delivered to the engine cylinder.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. A fuel injection pump for internal combustion engines, comprising means forming a plunger chamber, a plunger mounted for reciprocation within said chamber, a suction valve and a delivery valve mounted independently of each other and both arranged substantially coaxially with respect to each other and to said plunger with said delivery valve on the opposite side of said suction valve from said plunger, said suction valve including a head portion and a hollow guiding stem portion on the opposite side of said head portion from said plunger, said suction valve being opened automatically by the suction within said chamber, a valve spring located at least partially within said hollow stem portion and normally tending to close said suction valve, means forming both an abutment against which said spring may thrust and a stop for limiting movement of said suction valve in an opening direction, and a fuel supply duct extending at a substantial angle to said guiding stem portion and leading substantially to said head portion so that when said suction valve is open, fuel may flow through said duct and into said plunger chamber without flowing for any substantial distance along said guiding stem portion of said suction valve.

2. A fuel injection pump for internal combustion engines, comprising means forming a plunger chamber, a plunger mounted for reciprocation within said chamber, a suction valve and a delivery valve mounted independently of each other and both arranged substantially coaxially with respect to each other and to said plunger with said delivery valve on the opposite side of said suction valve from said plunger, said suction valve including a head portion and a hollow guiding stem portion on the opposite side of said head portion from said plunger, said suction valve being opened automatically by the suction within said chamber, a valve spring located at least partially within said hollow stem portion and normally tending to close said suction valve, means forming both an abutment against which said spring may thrust and a stop for limiting movement of said suction valve in an opening direction, valve block means closely embracing said stem portion of said suction valve from a point closely behind said head portion to the remote end of said stem portion from said head portion, to form a guide for said stem portion, said valve block means being recessed immediately behind said head portion to form a fuel inlet cavity surrounding said stem portion and immediately behind said head portion and having substantially a line contact with said head portion when said suction valve is closed, said valve block means further including a fuel supply duct spaced from said stem portion of said suction valve and leading to said inlet cavity, so that fuel may flow through said duct to said inlet cavity and thence past said head portion of said suction valve into said plunger chamber when said suction valve is open, without flowing for any substantial distance along said guiding stem portion.

3. A fuel injection pump comprising means forming a plunger chamber, a plunger mounted for reciprocation within said chamber, a suction valve having a head portion mounted for opening movement in a direction toward said chamber, to admit fuel into said chamber, said suction valve having a guiding stem portion extending from said head portion in a direction away from said plunger, said head portion having a substantially line contact with said chamber forming means when said valve is closed, spring means tending to close said suction valve, abutment means arranged to contact directly with said suction valve to limit motion thereof in an opening direction otherwise than through said spring means, a fuel supply duct leading to said suction valve immediately behind said head portion without extending for any substantial length along said guiding stem portion, to supply fuel to said valve otherwise than along said guiding stem portion, a delivery valve through which fuel may pass during the pressure stroke of said plunger within said chamber, and a fuel delivery conduit extending alongside said suction valve from said chamber to said delivery valve, said delivery conduit being substantially free of flow of fuel throughout except in one direction from said chamber to said delivery valve, said plunger, suction valve, and delivery valve all being substantially in coaxial alinement with each other, and said delivery valve being mounted independently of said suction valve and on the opposite side thereof from said plunger.

4. A suction valve construction for a high speed and high pressure fuel injection pump having a plunger mounted for reciprocation within a chamber, said valve construction comprising a valve block forming one end of said plunger chamber and including a valve head cavity in that face of said block which is toward said chamber and a valve stem cavity opening into said valve head cavity and extending from said head cavity in a direction away from said chamber, a suction valve having a head adapted to be seated adjacent an edge of said head cavity with substantially line contact with said valve block when the valve is closed and adapted to be automatically pulled away from said valve block by suction within said chamber to open the valve, said suction valve also having a hollow stem on the opposite side of said head from said chamber and of materially smaller diameter than said head and slidably fitting in said stem cavity to guide the opening and closing movements of said valve head with respect to said valve block, a coiled spring mounted at least partially within said hollow stem and constantly tending to close said valve, means forming both an abutment against which said spring may thrust and a stop limiting movement of said valve in an opening direction, and a fuel supply duct opening into said head cavity and spaced from at least the major part of said stem cavity, so that fuel may be supplied through said duct without flowing for any substantial distance along said valve stem.

5. A suction valve construction as described in claim 4, in which said abutment and stop means comprises a rod passing transversely through said valve stem and having its ends received in said valve block.

6. A fuel injection pump comprising hollow means having a pump plunger chamber and a valve cavity therein, a housing surrounding said hollow means, said housing having tight engagement with said hollow means at two spaced points and being recessed between said two points to provide a suction chamber and a by-pass chamber, said hollow means having an opening forming a duct establishing communication between said suction chamber and said valve cavity and an opening forming a duct establishing communication between said plunger chamber and said by-pass chamber, said housing having a portion between said suction chamber and said by-pass chamber extending close to but slightly spaced from said hollow means to leave, between said housing and said hollow means, restricted passage means connecting said by-pass chamber to said suction chamber.

7. A fuel injection pump according to claim 6, in which said restricted passage means is of substantially uniform cross sectional area throughout its length.

8. A fuel injection pump according to claim 6, in which said restricted passage means is of materially different cross sectional area at different points along its length.

9. A fuel injection pump according to claim 6, further including means for interrupting smooth flow of liquid fuel through said restricted passage means, to increase the throttling effect of said restricted passage means on fuel attempting to flow from said by-pass chamber to said suction chamber.

10. A fuel injection pump comprising a housing having a bore therein, means inserted in said bore to form a plunger chamber and a valve cavity, said housing bore being recessed at one point to form a suction chamber and recessed at another point axially spaced therefrom to form a by-pass chamber, a portion of the wall of said housing bore between said suction and by-pass chambers being spaced from the adjacent portion of the wall of said insert means to provide between said wall portions a passageway providing restricted communication between said suction chamber and said by-pass chamber, duct means connecting said suction chamber to said valve cavity, and other duct means connecting said plunger chamber to said by-pass chamber.

11. A fuel injection pump comprising housing means, cam means movable within said housing means, a tappet reciprocated by said cam means, a plunger operated by said tappet, said tappet having a longitudinal groove therein, an opening in said housing extending from the outer surface thereof inwardly to said tappet in alinement with said groove, a non-threaded pin mounted in said opening and having a portion with flattened sides extending into said groove to hold said tappet against turning in said housing, the outer end of said pin remote from said tappet lying wholly within said opening, and means separate from said pin and associated with said opening outwardly beyond said outer end of said pin for preventing outward withdrawal of said pin through said opening, the length of said pin being less than the diameter of said tappet, so that when said tappet is removed, said pin may be driven inwardly into the tappet space within said housing, to remove said pin from its opening.

12. A fuel injection pump comprising a tappet mounted for reciprocation, a pump plunger operated by said tappet, said plunger being mounted for turning movement to different positions of adjustment, a washer mounted on said plunger and having a portion for pressing against said plunger and another portion for pressing against said tappet, spring means surrounding said plunger and pressing against said washer to tend to move said plunger and said tappet in one direction, an adjusting sleeve surrounding said spring means, means for turning said adjusting sleeve to different positions of adjustment, means operatively connecting said adjusting sleeve to said plunger to turn said plunger upon turning said sleeve, and means for locking said washer against turning movement relatively to said tappet notwithstanding the turning movements of said plunger.

13. A fuel injection pump comprising a tappet mounted for reciprocation, a pump plunger operated by said tappet, said plunger including a shoulder and being mounted for turning movement to different positions of adjustment, a washer having a portion surrounding said plunger for engagement with said shoulder thereof and a tubular portion extending in a direction generally axially of said plunger for engagement with said tappet, said tubular portion of said washer having a lateral opening therein, spring means surrounding said plunger and pressing against said washer to tend to move said plunger and said tappet in one direction, an adjusting sleeve surrounding said spring means, means for turning said adjusting sleeve to different positions of adjustment, and an arm secured to said plunger and extending laterally through said opening in said tubular portion of said washer and being operatively connected to said adjusting sleeve to transmit turning movements of said sleeve to said plunger.

14. A fuel injection pump comprising a tappet mounted for reciprocation, a pump plunger operated by said tappet, said plunger including a shoulder and being mounted for turning movement to different positions of adjustment, a washer having a portion surrounding said plunger for engagement with said shoulder thereof and a tubular portion extending in a direction generally axially of said plunger for engagement with said tappet, said tubular portion of said washer having a lateral opening therein, spring means surrounding said plunger and pressing against said washer to tend to move said plunger and said tappet in one direction, an adjusting sleeve surrounding said spring means, means for turning said adjusting sleeve to different positions of adjustment, an arm secured to said plunger and extending laterally through said opening in said tubular portion of said washer and being operatively connected to said adjusting sleeve to transmit turning movements of said sleeve to said plunger, and means for locking said washer against turning movement relatively to said tappet notwithstanding turning movements of said plunger relatively to said tappet.

KURT ZWICK.
FRITZ DECKEL.
HANS FISCHLMAYR.
JULIUS ULSAMER.